(12) United States Patent
Gong et al.

(10) Patent No.: US 11,675,683 B2
(45) Date of Patent: Jun. 13, 2023

(54) METHOD, ELECTRONIC DEVICE, AND COMPUTER PROGRAM PRODUCT FOR MONITORING STORAGE SYSTEM

(71) Applicant: EMC IP Holding Company LLC, Hopkinton, MA (US)

(72) Inventors: Min Gong, Shanghai (CN); Haifeng Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 253 days.

(21) Appl. No.: 16/888,324

(22) Filed: May 29, 2020

(65) Prior Publication Data

US 2021/0342240 A1 Nov. 4, 2021

(30) Foreign Application Priority Data

Apr. 29, 2020 (CN) .......................... 202010358519.2

(51) Int. Cl.
| | | |
|---|---|---|
| G06F 11/30 | (2006.01) | |
| G06F 16/17 | (2019.01) | |
| G06F 16/903 | (2019.01) | |
| G06F 11/34 | (2006.01) | |

(52) U.S. Cl.
CPC ...... *G06F 11/3034* (2013.01); *G06F 11/3495* (2013.01); *G06F 16/1727* (2019.01); *G06F 16/90344* (2019.01)

(58) Field of Classification Search
CPC ............. G06F 11/3034; G06F 16/1727; G06F 16/90344; G06F 11/3495
See application file for complete search history.

(56) References Cited

U.S. PATENT DOCUMENTS

| | | | | |
|---|---|---|---|---|
| 8,131,784 | B1 * | 3/2012 | Zhuge | G06F 16/113 707/823 |
| 2004/0163033 | A1 * | 8/2004 | Wolfe | G06F 16/93 715/255 |
| 2010/0174745 | A1 * | 7/2010 | Ryan | G06F 3/067 707/E17.01 |
| 2014/0297781 | A1 * | 10/2014 | Brand | H04L 63/10 709/216 |
| 2015/0033224 | A1 * | 1/2015 | Maheshwari | G06F 9/5011 718/1 |
| 2016/0092568 | A1 * | 3/2016 | Barzik | G06F 16/285 707/738 |
| 2018/0121503 | A1 * | 5/2018 | Bakke | G06F 16/2246 |
| 2018/0322137 | A1 * | 11/2018 | Todd | G06F 16/176 |

* cited by examiner

*Primary Examiner* — Phong H Dang
(74) *Attorney, Agent, or Firm* — Amin, Turocy & Watson, LLP (57) ABSTRACT

The present disclosure relates to a method, an electronic device, and a computer program product for monitoring a storage system. For example, a method of monitoring a storage system is provided. This method may include setting a quota type of a folder to be monitored in the storage system to a monitored type. This method may further include acquiring quota monitoring data of which the quota type is the monitored type from a quota monitoring report associated with the storage system. In addition, this method may further include generating storage information of the folder based on the quota monitoring data. In this way, the time spent on monitoring the storage system can be shortened, the system resources can be saved, and ultimately, the user experience can be improved.

20 Claims, 5 Drawing Sheets

METHOD, ELECTRONIC DEVICE, AND COMPUTER PROGRAM PRODUCT FOR MONITORING STORAGE SYSTEM

RELATED APPLICATION

The present application claims the benefit of priority to Chinese Patent Application No. 202010358519.2, filed on Apr. 29, 2020, which application is hereby incorporated into the present application by reference herein in its entirety.

TECHNICAL FIELD

Embodiments of the present disclosure generally relate to the field of computer networks, and, in particular, to a method, an electronic device, and a computer program product for monitoring a storage system.

BACKGROUND

Monitoring capacity usage in a storage system can be important for storage management. Especially for a file system, monitoring a consumption capacity of a specific folder or its user can provide decision-making data support for a user such as an IT administrator. Generally, if a user wants to monitor a consumption capacity of a folder of interest, the user can select the folder to be monitored for viewing. However, a storage-related attribute interface of this folder demands calculation of the consumption capacity of sub-folders and files thereof under this folder. Because a file system has massive storage resources, this bottom-up statistical calculation is time-consuming, thus resulting in a bad user experience. In addition, if the user wants to regularly monitor the consumption capacity of the folder of interest, this storage system needs to be regularly scanned, which will also cause a great waste of system resources including database space, CPU, memory, etc.

SUMMARY

The embodiments of the present disclosure provide a method, an electronic device, and a computer program product for monitoring a storage system.

In a first aspect of the present disclosure, a method of monitoring a storage system is provided. This method may include setting a quota type of a folder to be monitored in the storage system to a monitored type. This method may further include acquiring quota monitoring data of which the quota type is the monitored type from a quota monitoring report associated with the storage system. In addition, this method may further include generating storage information of the folder based on the quota monitoring data.

In a second aspect of the present disclosure, an electronic device is provided. This device includes: at least one processing unit; and at least one memory coupled to the at least one processing unit and storing instructions for execution by the at least one processing unit, wherein the instructions, when being executed by the at least one processing unit, cause the device to perform actions including: setting a quota type of a folder to be monitored in a storage system to a monitored type; acquiring quota monitoring data of which the quota type is the monitored type from a quota monitoring report associated with the storage system; and generating storage information of the folder based on the quota monitoring data.

In a third aspect of the present disclosure, a computer program product is provided. This computer program product is tangibly stored in a non-transitory computer storage medium and includes machine-executable instructions. The machine-executable instructions, when being executed by a device, cause this device to implement any step of the method described according to the first aspect of the present disclosure.

The summary part is provided to introduce the selection of concepts in a simplified form, which will be further described in the Detailed Description below. The summary part is neither intended to identify key features or essential features of the present disclosure, nor intended to limit the scope of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts.

The same or corresponding reference numerals in the accompanying drawings represent the same or corresponding parts.

DETAILED DESCRIPTION

Hereinafter, example embodiments of the present disclosure will be described in more detail with reference to the accompanying drawings. Although example embodiments of the present disclosure are shown in the accompanying drawings, it should be understood that the present disclosure can be implemented in various forms and should not be limited by the embodiments set forth herein. Rather, these embodiments are provided so that the present disclosure will be more thorough and complete, and the scope of the present disclosure will be fully conveyed to those skilled in the art.

As used herein, the term "including" and variations thereof mean open-ended inclusion, that is, "including but not limited to." Unless specially stated, the term "or" means "and/or." The term "based on" means "based at least in part on." The terms "one example embodiment" and "one embodiment" mean "at least one example embodiment." The term "another embodiment" means "at least one additional embodiment." The terms "first," "second," etc. may refer to different or the same objects. Other explicit and implicit definitions may further be included below.

As mentioned above, in a conventional process of monitoring a storage system, a user usually views the capacity usage of a folder of interest directly. However, due to the huge capacity of a storage system, the process of calculating the consumption capacity of sub-folders and files thereof under the folder of interest by polling in a bottom-up manner can take tens of minutes or even tens of hours. At the same time, the operation of scanning each folder and its files as well as the operation of calculating a consumption capacity will both occupy system resources such as CPU and memory. In addition, if a user wants to regularly monitor several folders of interest, it is necessary to regularly scan the folders to be monitored in the storage system, which also causes a waste of resources. The problem that needs to be solved urgently is how to acquire storage information of a folder of interest or even relevant information of a user of the folder at a low cost by reasonably utilizing an existing system architecture.

In order to solve the above problem and improve the user experience, an example embodiment of the present disclosure proposes a mechanism for monitoring a folder of interest in a storage system and user thereof by using a quota monitoring report mechanism in the storage system. This monitoring mechanism can realize the monitoring of a folder of interest and user thereof by making minor improvements to the process of quota monitoring report, thereby shortening the time spent on monitoring the storage system, saving system resources, and ultimately improving the user experience.

Figure 1:
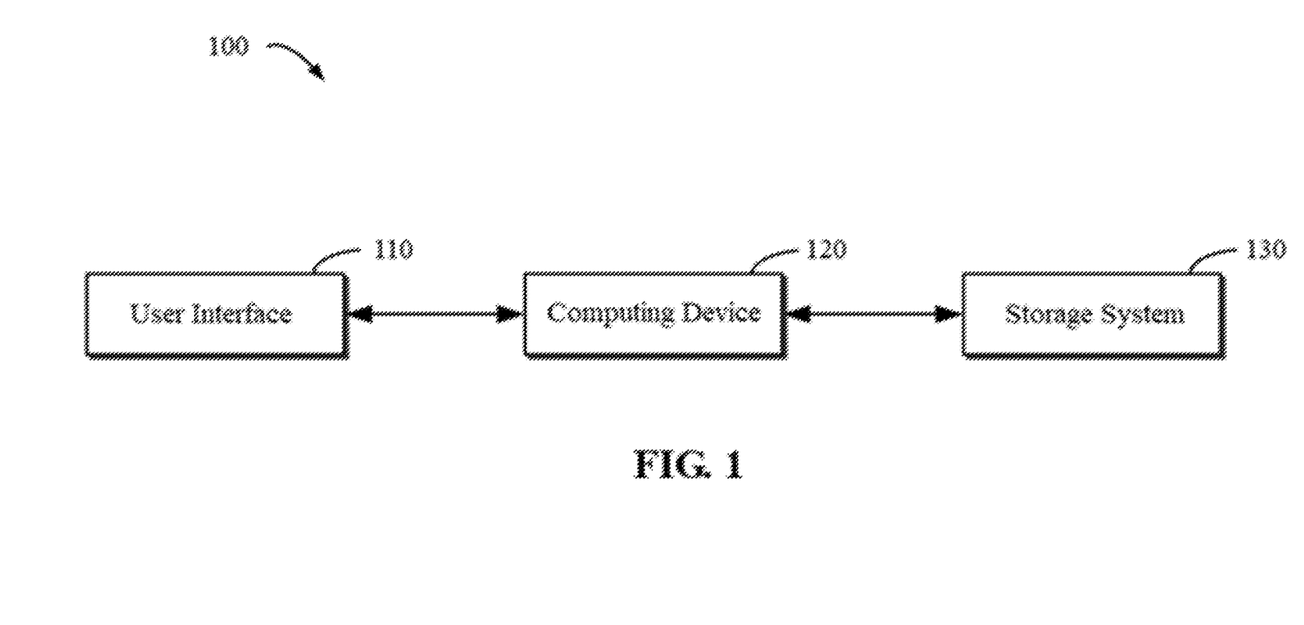
FIG. 1 illustrates a schematic diagram of an example environment in which embodiments of the present disclosure can be implemented.

FIG. 1 illustrates a schematic diagram of example environment 100 in which embodiments of the present disclosure can be implemented. In example environment 100, user interface 110 may be an input/output device that helps a user to interact with computing device 120. As an example, user interface 110 may receive instruction information from a user such as an IT administrator, for example, a folder to be monitored or its user, which is selected by the user. As another example, user interface 110 may also display data in computing device 120 to the user. The above examples are only to describe the present disclosure, not to specifically limit the present disclosure.

As shown in FIG. 1, the user can input the folder to be monitored or its user to computing device 120 via user interface 110. It should be understood that the above-mentioned folder to be monitored is a folder in storage system 130, which may be a storage space created by the IT administrator through performing quota setting according to the folder user's requirements, and the folder user is authorized to use this storage space by the user such as the IT administrator. It should be understood that since a storage space for which quota setting requires a user's authorization is usually a folder that involves important work or business, the folder created through quota setting may usually be a folder of "Interest" to the user.

In some embodiments, computing device 120 may be located locally, remotely, or in the cloud, and it is used to acquire storage information of a folder in storage system 130 based on the quota monitoring report mechanism, and display the storage information of the folder to the user via user interface 110. In some embodiments, computing device 120 may include, but is not limited to, personal computers, server computers, handheld or laptop devices, mobile devices (such as mobile phones, personal digital assistants (PDAs), media players, etc.), multiprocessor systems, consumer electronics, small computers, mainframe computers, distributed computing environments including any of the above systems or devices, etc.

In the embodiment of FIG. 1, after receiving a request from computing device 120 for generating a quota monitoring report, storage system 130 returns the quota monitoring report to computing device 120. Computing device 120 acquires the report content about the folder in which the user is interested and user thereof from the received quota monitoring report, and generates corresponding storage information based on the report content. Finally, the storage information is returned to user interface 110. In this way, the monitoring process of the storage system no longer needs to wait for a long time, thereby saving a lot of time and system resources.

It should be understood that the environment shown in FIG. 1 is merely an example, and does not specifically limit the present disclosure. The number and structure of components and the arrangement of the environment in the embodiment shown in FIG. 1 are examples for description, and are not intended to limit the present disclosure in any way.

Figure 2:
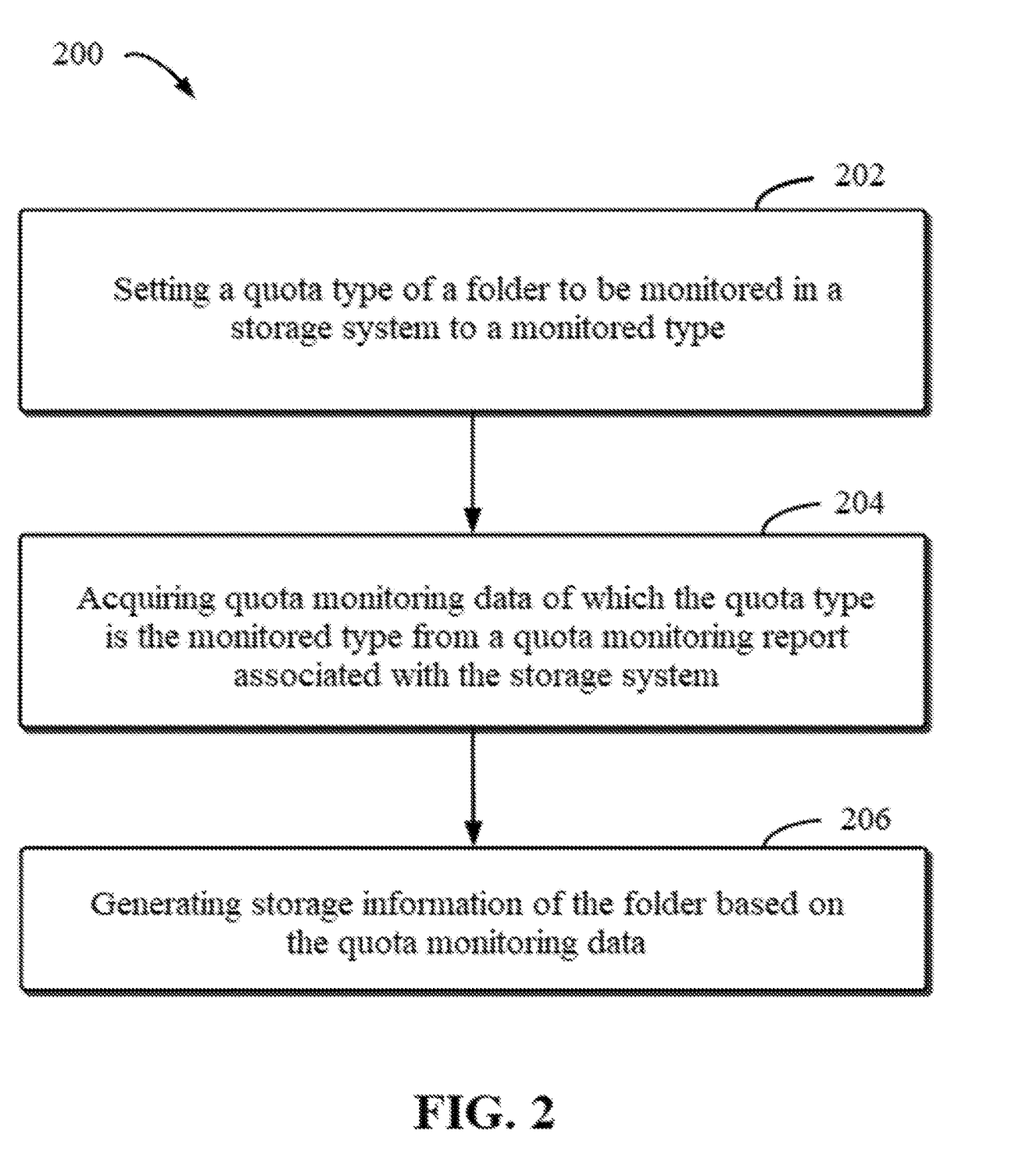
FIG. 2 illustrates a flowchart of a process for monitoring a storage system according to an embodiment of the present disclosure.

FIG. 2 illustrates a flowchart of process 200 for monitoring a storage system according to an embodiment of the present disclosure. In some embodiments, process 200 can be implemented by computing device 120 in FIG. 1. As an example, process 200 may be implemented in example environment 100 shown in FIG. 1. Process 200 for monitoring a storage system according to an embodiment of the present disclosure will now be described with reference to FIG. 2. For ease of understanding, the specific situations mentioned in the following description are all examples and are not intended to limit the scope of protection of the present disclosure.

At 202, computing device 120 may set a quota type of a folder to be monitored in storage system 130 to a monitored type. As an example, computing device 120 may receive from user interface 110 directory information about a folder specified by a user such as an IT administrator. It should be understood that, in storage system 130 such as a file system, the directory information about a folder is usually the name of the folder, which is used to determine the access path to this folder. It should also be understood that the process in which computing device 120 sets the quota type to the monitored type may be to mark the folder to be monitored with a "Monitored" or "Interested" tag as a basis for a subsequent quota monitoring report filtering process.

Figure 3:
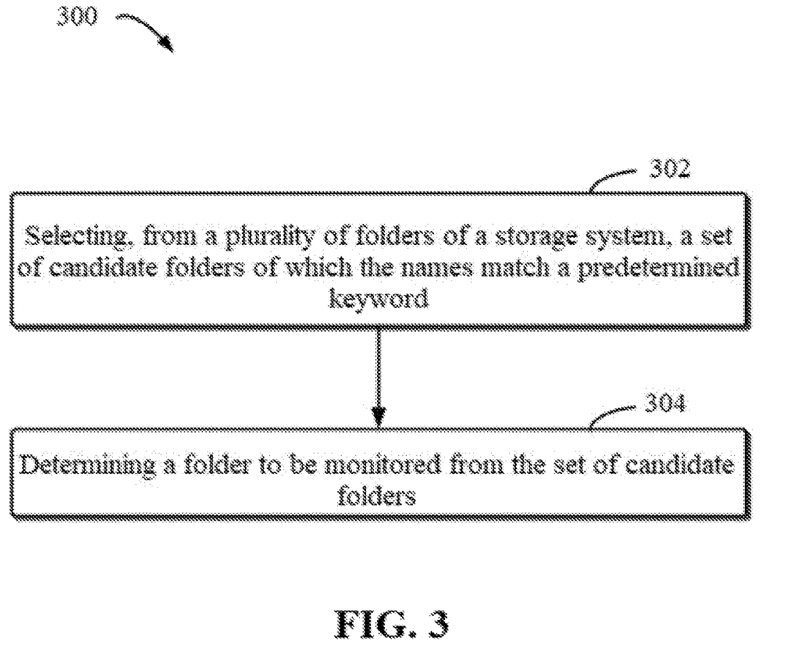
FIG. 3 illustrates a flowchart of an example process for determining a folder to be monitored according to an embodiment of the present disclosure.

In some embodiments, the folder to be monitored may be selected by the user via user interface 110. Alternatively or additionally, the folder to be monitored may also be selected based on a preset matching mechanism, and this matching mechanism may be set and changed by the user. In particular, FIG. 3 illustrates a flowchart of example process 300 for determining a folder to be monitored according to an embodiment of the present disclosure. In some embodiments, process 300 can be implemented by computing device 120 in FIG. 1. As an example, process 300 may be implemented in example environment 100 shown in FIG. 1. Process 300 for determining a folder to be monitored according to an embodiment of the present disclosure will now be described with reference to FIG. 3. For ease of understanding, the specific situations mentioned in the following description are all examples and are not intended to limit the scope of protection of the present disclosure.

At 302, computing device 120 may select, from a plurality of folders of storage system 130, a set of candidate folders of which the names match a predetermined keyword. The keyword may be preset by a user. As an example, when a character representation that is the same as this keyword exists in the name of a folder in storage system 130, this folder may be selected. As another example, it may be determined by the natural language processing (NLP) technology whether a character representation that is the same as or similar to this keyword exists in the name of a folder in storage system 130, and if so, this folder may be selected.

At 304, computing device 120 may determine the folder to be monitored from the above set of candidate folders. As an example, computing device 120 may determine all the candidate folders mentioned above as folders to be monitored. Alternatively or additionally, when a folder of "Not interested" that is selected by the user at user interface 110 is contained in all of the candidate folders mentioned above, computing device 120 will only determine folders other than the folder of "Not interested" as folders to be monitored. In this way, computing device 120 can determine the folder to be monitored based on the needs of the user side.

It should be understood that, in order to provide a basis for a subsequent quota monitoring report filtering module, the determined folder to be monitored may be marked as "Monitored" or "Interested." For example, when the user desires to monitor a specific folder in the storage system, the quota type of this specific folder will be set to "Monitored."

Returning to FIG. 2, at 204, computing device 120 may acquire quota monitoring data of which the quota type is the monitored type from a quota monitoring report associated with storage system 130. In some embodiments, after computing device 120 marks the quota type of a specific folder in storage system 130 as "Monitored" based on the user's monitoring requirements, storage system 130 will still regularly generate a quota monitoring report. This quota monitoring report not only contains monitoring data of the folder to be monitored, but also contains monitoring data of a folder of "Not interested" which is created through conventional quota settings. Therefore, computing device 120 only needs to filter out quota monitoring data of which the quota type is marked as "Monitored" from massive quota monitoring data in the quota monitoring report. In this way, monitoring data of the folder to be monitored can be acquired using the quota monitoring mechanism.

At 206, computing device 120 may further generate storage information of the folder based on the quota monitoring data. In some embodiments, computing device 120 may determine a used storage capacity of a folder of "Interested" based on the acquired quota monitoring data. Alternatively or additionally, computing device 120 may also determine the frequency of access, the time of access, and even the specific user of the access to the folder of "Interested" based on the acquired quota monitoring data.

Figure 4:
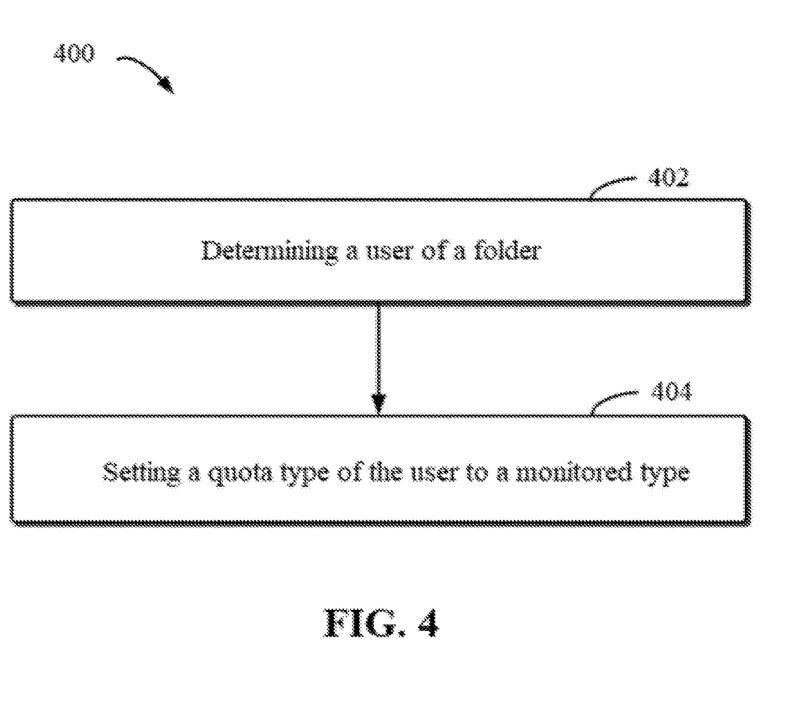
FIG. 4 illustrates a flowchart of an example process for determining a user to be monitored according to an embodiment of the present disclosure.

In some embodiments, process 200 may also include determining, by computing device 120, a user to be monitored that is selected by the user. In particular, FIG. 4 illustrates a flowchart of example process 400 for determining a user to be monitored according to an embodiment of the present disclosure. In some embodiments, process 400 can be implemented by computing device 120 in FIG. 1. As an example, process 400 may be implemented in example environment 100 shown in FIG. 1. Process 400 for determining a user to be monitored according to an embodiment of the present disclosure will now be described with reference to FIG. 4. For ease of understanding, the specific data mentioned in the following description is all examples and is not intended to limit the scope of protection of the present disclosure.

At 402, computing device 120 may determine a user of a folder. As an example, a user such as an IT administrator may select specific users of a folder to be monitored via user interface 110, so that computing device 120 may determine one or more specific users of this folder based on the user's selection. It should be understood that when a certain folder is allocated as quota for multiple users, this folder can only be accessed by the authorized multiple users. Therefore, when the folder to be monitored is determined, some or all of the users of this folder can be determined at computing device 120.

At 404, computing device 120 may set the users' quota types to the monitored type. In some embodiments, after computing device 120 marks the quota type of a specific user among the users of the folder to be monitored as "Monitored" based on the user's monitoring requirements, storage system 130 will still regularly generate a quota monitoring report. This quota monitoring report not only contains monitoring data of the specific user, but also contains monitoring data of other users configured through conventional quota settings. Therefore, computing device 120 only needs to filter out quota monitoring data of which the quota type is marked as "Monitored" from massive quota monitoring data in the quota monitoring report.

In this way, on the basis of monitoring a specific folder, a specific user of the specific folder can also be monitored, and the time and resource costs required for the monitoring are significantly reduced compared to that in conventional monitoring methods.

In addition, returning to 206 again, since computing device 120 can set the monitored type of a user, the computing device can further determine, based on the acquired quota monitoring data, a storage capacity of a folder occupied by a user of "Interested" in this folder. Alternatively or additionally, computing device 120 may also determine the frequency, the time, etc., of access by the user of "Interested" based on the acquired quota monitoring data.

Alternatively or additionally, when computing device 120 is configured to monitor multiple folders in storage system 130 and multiple users of these folders, computing device 120 can also determine a total storage capacity occupied by a specific user based on the usage of this specific user on the monitored multiple folders.

Figure 5:
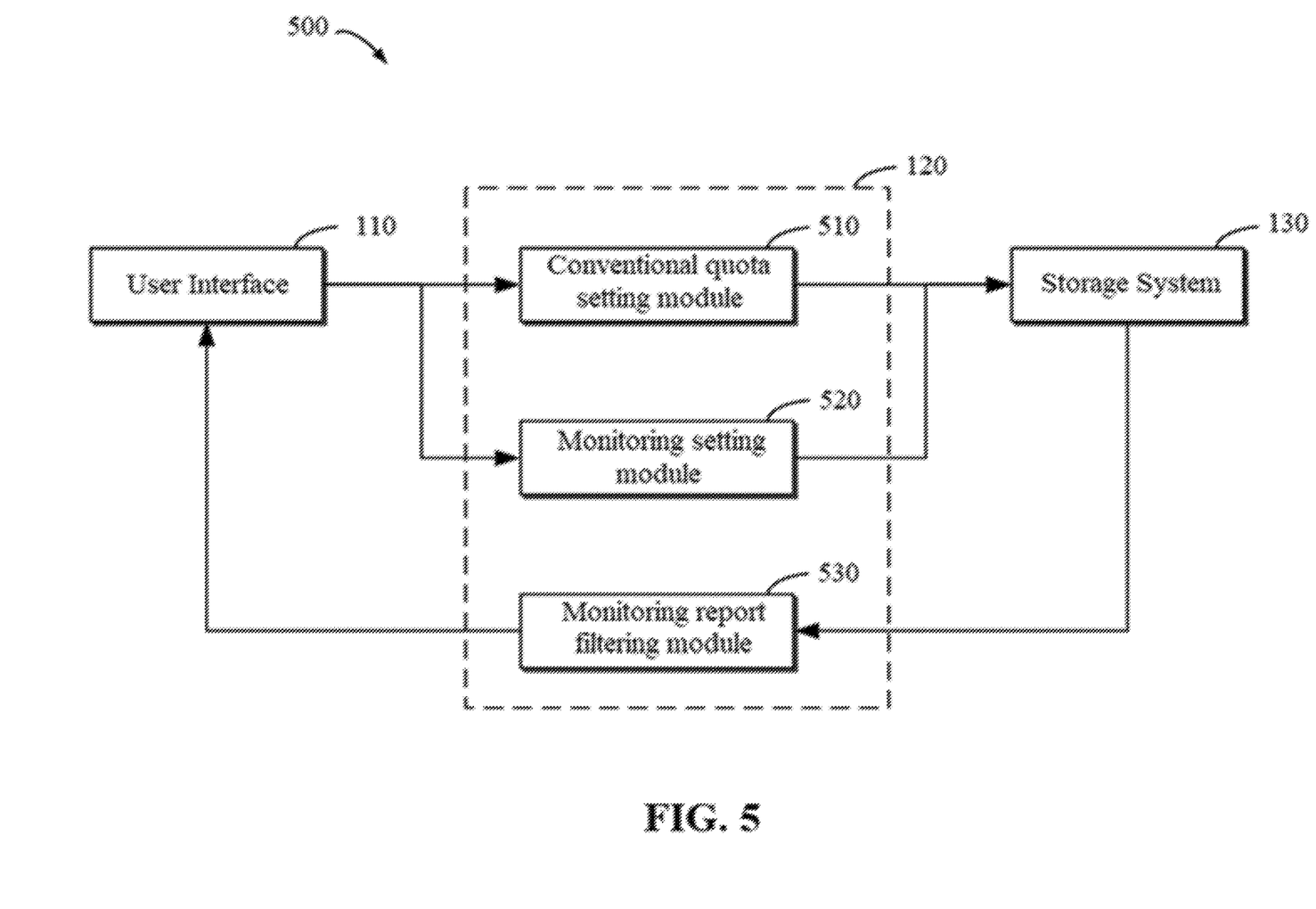
FIG. 5 illustrates a detailed diagram of an example environment according to an embodiment of the present disclosure.

In order to more clearly describe preferred embodiments of the present disclosure, FIG. 5 illustrates a detailed diagram of example environment 500 according to an embodiment of the present disclosure. As shown in FIG. 5, computing device 120 includes at least three modules: conventional quota setting module 510, monitoring setting module 520, and monitoring report filtering module 530. As an example, the user may select a folder File1 to be monitored and users User1 and User2 of this folder via user interface 110. Therefore, monitoring setting module 520 may set, based on the user's needs, the quota types of both the folder File1 in storage system 130 and the users User1 and User2 of this folder to "Monitored." Correspondingly, the quota types of other folders in which the user is not interested may be set to "Regular," "Unlimited storage capacity," or other conventional types by conventional quota setting module 510.

When a quota report module in storage system 130 generates quota monitoring reports associated with storage system 130, monitoring report filtering module 530 is configured to filter quota monitoring reports based on quota types so as to acquire therefrom quota monitoring data of the "Monitored" type. Furthermore, storage information about this folder and its users generated based on the quota monitoring data can be fed back to the user via user interface 110. The user can then acquire monitoring information about the used storage capacity of the interested folder File1 and the used storage capacities of the users User1 and User2 of this folder.

Through the above embodiments, the time cost and system resource cost required for monitoring the storage system can be significantly reduced. In addition, the embodiments of the present disclosure can also support real-time system monitoring and periodic system monitoring based on a user's needs, and can monitor users of a specific folder while monitoring this folder, thereby providing the user with a function for monitoring a storage system in a more friendly manner.

Figure 6:
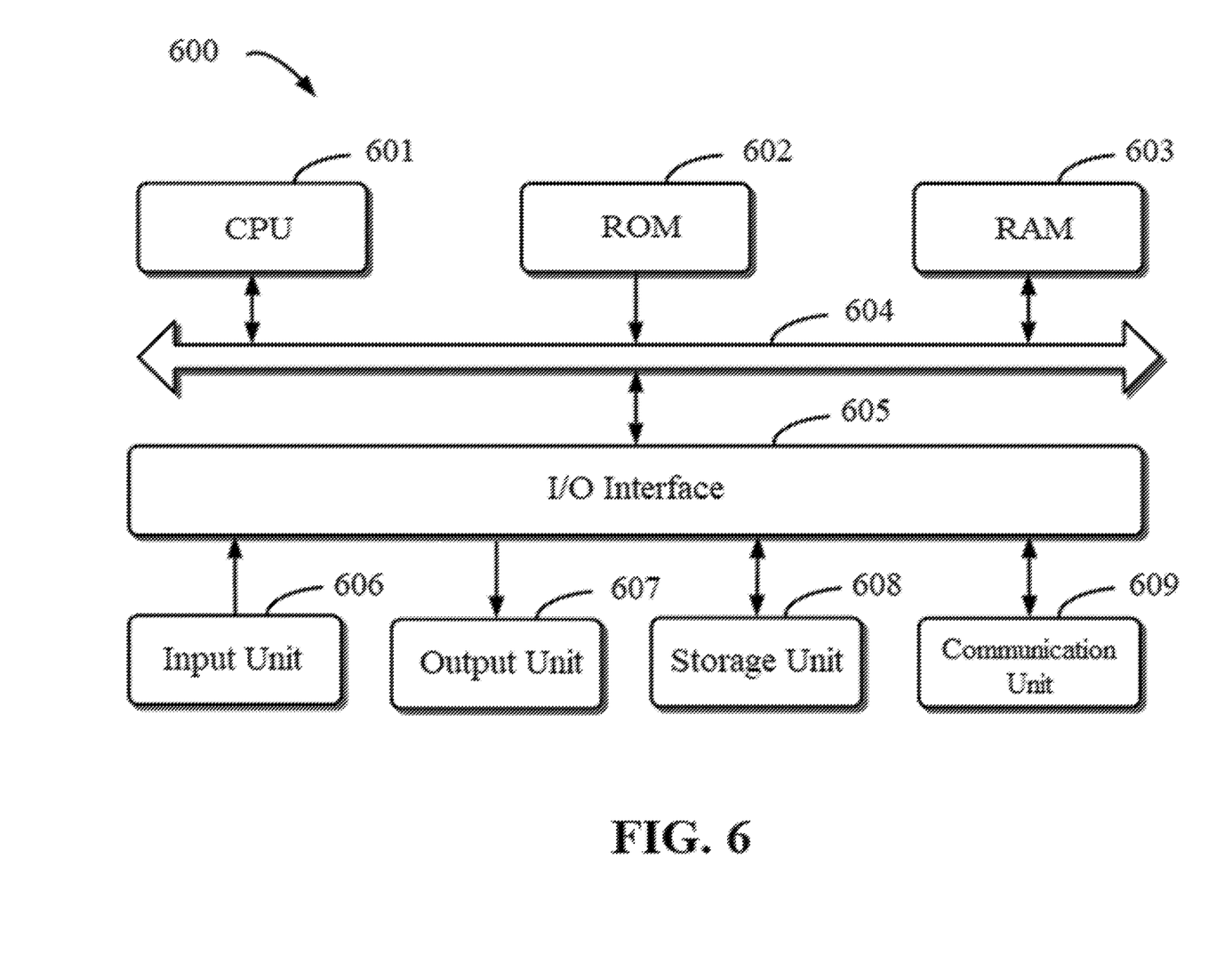
FIG. 6 illustrates a schematic block diagram of an example device that can be used to implement embodiments of the present disclosure.

FIG. 6 illustrates a schematic block diagram of example device 600 that can be used to implement the embodiments of the present disclosure. As shown in the figure, device 600 includes central processing unit (CPU) 601 that can perform various appropriate actions and processing according to computer program instructions stored in read-only memory (ROM) 602 or computer program instructions loaded from storage unit 608 into random access memory (RAM) 603. In RAM 603, various programs and data required for the operation of device 600 can also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices through a computer network such as the Internet and/or various telecommunication networks.

Various processes and processing described above, for example, processes 200, 300, and/or 400, can be performed by processing unit 601. For example, in some embodiments, processes 200, 300, and/or 400 may be implemented as a computer software program that is tangibly included in a machine-readable medium, for example, storage unit 608. In some embodiments, part or all of the computer program may be loaded and/or installed onto device 600 via ROM 602 and/or communication unit 609. When the computer program is loaded into RAM 603 and executed by CPU 601, one or more actions of processes 200, 300, and/or 400 described above may be performed.

The present disclosure can be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device such as a punch card or a protruding structure in a groove with instructions stored thereon, and any suitable combination of the foregoing. The computer-readable storage medium used herein is not to be interpreted as transient signals per se, such as radio waves or other freely propagated electromagnetic waves, electromagnetic waves propagated through waveguides or other transmission media (for example, light pulses through fiber-optic cables), or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk, C++, and the like, and conventional procedural programming languages, such as the "C" language or similar programming languages. Computer-readable program instructions may be executed entirely on a user's computer, executed partly on a user's computer, executed as a stand-alone software package, executed partly on a user's computer and partly on a remote computer, or executed entirely on a remote computer or a server. In the case where a remote computer is involved, the remote computer can be connected to a user's computer through any kind of networks, including a local area network (LAN) or a wide area network (WAN), or can be connected to an external computer (for example, connected through the Internet using an Internet service provider). In some embodiments, an electronic circuit, for example, a programmable logic circuit, a field programmable gate array (FPGA), or a programmable logic array (PLA), is customized by utilizing state information of computer-readable program instructions, wherein the electronic circuit may execute the computer-readable program instructions so as to implement various aspects of the present disclosure.

Various aspects of the present disclosure are described herein with reference to flowcharts and/or block diagrams of the method, apparatus (system), and computer program product according to embodiments of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium storing instructions includes an article of manufacture that includes instructions for implementing various aspects of the functions/actions specified in one or more blocks in the flowcharts and/or block diagrams.

The computer-readable program instructions can also be loaded onto a computer, another programmable data processing apparatus, or another device, so that a series of operating steps can be performed on the computer, another programmable data processing apparatus, or another device to produce a computer-implemented process, such that the instructions executed on the computer, another programmable data processing apparatus, or another device can implement the functions/actions specified in one or more blocks in the flowcharts and/or block diagrams.

The flowcharts and block diagrams in the accompanying drawings illustrate architectures, functions, and operations of possible implementations of the systems, methods, and computer program products according to multiple embodiments of the present disclosure. In this regard, each block in the flowcharts or block diagrams may represent a module, a program segment, or a part of an instruction, which contains one or more executable instructions for implementing specified logical functions. In some alternative implementations, the functions marked in the blocks may also occur in an order different from that marked in the accompanying drawings. For example, two consecutive blocks may actually be executed substantially in parallel, and they may sometimes be executed in a reverse order, depending on the functions involved. It should also be noted that each block in the block diagrams and/or flowcharts and combinations of blocks in the block diagrams and/or flowcharts can be implemented in a dedicated hardware-based system for performing specified functions or actions, or can be implemented with a combination of dedicated hardware and computer instructions.

The embodiments of the present disclosure have been described above. The above description is illustrative and not exhaustive, and is not limited to the disclosed embodiments. Many modifications and variations will be apparent to those skilled in the art without departing from the scope and spirit of the described embodiments. The terms used herein are chosen to best explain the principles and practical applications of the embodiments or the technical improvements to technologies in the market, or to enable other persons of ordinary skill in the art to understand the embodiments disclosed herein.

The invention claimed is:

1. A method, comprising:
setting, by a system comprising a processor, a first quota type of a first folder to be monitored in a storage system to a monitored type, wherein the monitored type indicates monitoring of the first folder independently of enforcing a quota;
setting, by the system, a second quota type of a second folder in the storage system to a type that does not indicate the monitoring of the second folder independently of enforcing the quota;
generating, by the system, a quota monitoring report associated with the first folder and the second folder;
filtering, by the system, the quota monitoring report based on quota types to produce monitoring data of the first quota type; and
displaying, by the system, information about the first folder and a user account associated with the first folder based on the monitoring data of the first quota type.

2. The method according to claim 1, further comprising:
determining that the user account is associated with a user of the first folder.

3. The method according to claim 2, further comprising:
setting the first quota type of the user account to the monitored type.

4. The method according to claim 1, further comprising:
selecting, from a plurality of folders of the storage system, a set of candidate folders for which corresponding names match a predetermined keyword; and
determining that the first folder is to be monitored from the set of candidate folders.

5. The method according to claim 1, wherein the filtering of the quota monitoring report comprises:
determining a used storage capacity of the first folder based on the quota monitoring report.

6. The method according to claim 2, wherein the filtering of the quota monitoring report comprises:
determining a storage capacity of the first folder occupied by the user of the first folder based on the quota monitoring report.

7. A device, comprising:
at least one processing unit; and
at least one memory coupled to the at least one processing unit and storing instructions for execution by the at least one processing unit, wherein the instructions, when being executed by the at least one processing unit, cause the device to perform operations comprising:
setting a first quota type of a first folder to be monitored in a storage system to a monitored type, wherein the monitored type indicates monitoring of the first folder independently of enforcing a quota;
setting a second quota type of a second folder in the storage system to a type that does not indicate the monitoring of the second folder independently of enforcing the quota;
generating a quota monitoring report associated with the first folder and the second folder;
filtering the quota monitoring report based on quota types to produce monitoring data of the first quota type; and
storing the monitoring data.

8. The device according to claim 7, wherein the operations further comprise:
determining a user of the first folder; and
setting the quota type of the user to the monitored type.

9. The device according to claim 7, wherein the operations further comprise:
selecting, from a plurality of folders of the storage system, a set of candidate folders for which respective names of the set of candidate folders match a predetermined keyword.

10. The device according to claim 9, wherein the operations further comprise:
determining that the first folder is to be monitored from the set of candidate folders.

11. The device according to claim 7, wherein the filtering of the quota monitoring report comprises:
determining a used storage capacity of the first folder based on the quota monitoring report.

12. The device according to claim 8, wherein the filtering of the quota monitoring report comprises:
 determining a storage capacity of the first folder occupied by the user of the folder based on the quota monitoring report.

13. A computer program product tangibly stored in a non-transitory computer storage medium and comprising machine-executable instructions, wherein, when being executed by a device, the machine-executable instructions cause the device to implement operations, comprising:
 setting a quota type of a first folder to be monitored in a storage system to a monitored type by a monitoring setting component, wherein the monitored type indicates monitoring of the first folder independently of a quota;
 generating, by a quota report component, a quota monitoring report associated with the first folder and a second folder that is not associated with the monitored type;
 filtering, by a monitoring report filtering component, the quota monitoring report based on quota types to produce monitoring data of the quota type; and
 storing the monitoring data.

14. The computer program product of claim 13, wherein the operations further comprise:
 determining a user of the first folder.

15. The computer program product of claim 14, wherein the operations further comprise:
 setting the quota type of the user to the monitored type.

16. The computer program product according to claim 14, wherein the filtering of the quota monitoring report comprises:
 based on the quota monitoring data, determining a storage capacity of the first folder occupied by the user of the first folder.

17. The computer program product of claim 13, wherein the operations further comprise:
 selecting, from a plurality of folders of the storage system, a set of candidate folders that satisfy a defined criterion.

18. The computer program product of claim 17, wherein the operations further comprise:
 determining that the first folder is to be monitored from the set of candidate folders.

19. The computer program product of claim 17, wherein satisfaction of the defined criterion comprises names of candidate folders of the set of candidate folders matching a specified keyword.

20. The computer program product according to claim 13, wherein the generating of the storage information of the first folder comprises:
 based on the quota monitoring data, determining a used storage capacity of the first folder.

* * * * *